(12) United States Patent
Li

(10) Patent No.: US 8,121,190 B2
(45) Date of Patent: Feb. 21, 2012

(54) METHOD FOR VIDEO CODING A SEQUENCE OF DIGITIZED IMAGES

(75) Inventor: Xiang Li, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 1348 days.

(21) Appl. No.: 11/734,894

(22) Filed: Apr. 13, 2007

(65) Prior Publication Data

US 2008/0084929 A1    Apr. 10, 2008

(51) Int. Cl.
*H04N 7/12* (2006.01)
(52) U.S. Cl. .................................. 375/240.07
(58) Field of Classification Search ............ 375/240.07, 375/240, 240.01, 240.12
See application file for complete search history.

(56) References Cited

U.S. PATENT DOCUMENTS

| 7,801,220 B2 * | 9/2010 | Zhang et al. | 375/240.19 |
| 2004/0120398 A1 * | 6/2004 | Zhang et al. | 375/240.03 |

FOREIGN PATENT DOCUMENTS

| EP | 20060020948 | * | 10/2006 |
| EP | 1940176 A2 | * | 7/2007 |

OTHER PUBLICATIONS

L. Chen et al., "Adaptive Lamba Estimation in Langrangian Rate-Distortion Optimization for Video Coding" in Visual Comm. and Image Processing. Jan. 17-19, 2006.
JVT, H264/AVC Reference Software (JM10.2), http://iphome.hhi.de/Suehring/tml/, 2006.
JVT Advanced Video Coding (AVC)—3rd Edition, ITU-T Rec. H.264 and ISO/IEC 14496-10 (MPEG-4 Part 10), 2004.
Z.H. He and S.K. Mitra, "Optimum Bit Allocation and Accurate Rate Control for Video Coding via p-Domain Source Modeling", IEEE Trans, Circuits Syst. Video Technol. vol. 12, No. 10, pp. 840-849, 2002.
Wiegant T., et al., "Langrange Multiplier Selection in Hybrid Video Coder Control", in IEEE Int. Copnf. on Image Processing, 2001, pp. 542-545, vol. 3.
E. Y. Lam et al., "A Mathematical Analysis of the DCT Coefficient Distributions for Images", IEEE Trans. Image Process, vol. 9, No. 10, pp. 1661-1666, 2000.
ITU-T Video Coding for Low Bitrate Communication, ITU-T, Rec. H. 263 Version 3 (H.263++), 2000.
"Final Report From the Video Quality Experts Group on the Validation of Objective Models of Video Quality Assessment", Tech. Rep., ITU-T VQEG, COM 9-80-E, Jun. 2000, 16th test sequence.

(Continued)

*Primary Examiner* — Nirav B. Patel
(74) *Attorney, Agent, or Firm* — Schiff Hardin LLP

(57) ABSTRACT

The invention relates to a method for video coding a sequence of digitized images comprising predicting the contents of each image taking into account a rate distortion optimization criterion being dependent on a Lagrange multiplier; transforming the prediction error resulting from predicting step into a plurality of transformed residual coefficients in each image; quantizing the transformed residual coefficients in each image; wherein the Lagrange multiplier is determined for each image based on a probability distribution of the transformed residual coefficients of the respective image, the probability distribution having its maximum probability at its mean zero and being formed such that the probabilities decrease to zero from the mean to large absolute values of the transformed residual coefficients, whereby the variance of the probability distribution is calculated from the plurality of transformed residual coefficients in the respective image.

16 Claims, 3 Drawing Sheets

OTHER PUBLICATIONS

ITU-T/SG16/Q15-D-65, Video Codec Test Model, Near Term, Version 10 (TMN-10), Draft 1, Apr. 1998.

G.J. Sullivan et al., "Rate-Distortion Optimization for Video Compression", IEEE Signal Process., Mag. vol. 15, No. 6, pp. 74-90, 1998.

Wiegand T. et al., "Rate-Distortion Optimized Mode Selection for Very Low Bit Rate Video Coding and the Emerging H.263 Standard", IEEE Trans. Circuits Syst. Video Technol., vol. 6, No. 2, pp. 182-190, 1996.

H. Gish and J. Pierce, "Asymptotically Efficient Quantizing", IEEE Trans. Inf. Theory, vol. 14, No. 5, pp. 676-683, 1968.

ITU-T H.264. Series H: Audiovisual and Multimedia Systems Infratructure of Audiovisual Services—Coding of Moving Video: Advanced Video Coding for Generic Audiovisual Services. Mar. 2005.

* cited by examiner

| | qp | HR-λ | | | Lap-λ | | | PSNR [dB] | ΔR |
|---|---|---|---|---|---|---|---|---|---|
| | | PSNR [dB] | R [Kbps] | Aver λ | PSNR [dB] | R [Kbps] | Aver λ | | |
| V1 | 36 | 35.31 | 169.9 | 217.6 | 35.48 | 172.3 | 161.9 | 0.17 | 1.39% |
| | 40 | 32.03 | 117.3 | 548.3 | 32.21 | 119.4 | 355.5 | 0.18 | 1.75% |
| | 44 | 29.65 | 87.3 | 1381.7 | 30.07 | 89.4 | 738.6 | 0.42 | 2.45% |
| | 48 | 27.47 | 61.8 | 3481.6 | 28.07 | 65.5 | 1518.7 | 0.60 | 6.01% |
| V2 | 36 | 34.22 | 767.6 | 217.6 | 34.36 | 779.1 | 172.4 | 0.14 | 1.50% |
| | 40 | 31.68 | 518.3 | 548.3 | 31.91 | 530.3 | 382.9 | 0.23 | 2.31% |
| | 44 | 28.95 | 351.3 | 1381.7 | 29.32 | 368.3 | 812.6 | 0.38 | 4.85% |
| | 48 | 26.43 | 215.6 | 3481.6 | 27.12 | 239.0 | 1604.3 | 0.68 | 10.85% |
| V3 | 36 | 30.33 | 2007.0 | 217.6 | 30.43 | 2025.8 | 187.8 | 0.10 | 9.94% |
| | 40 | 27.34 | 1321.0 | 548.3 | 27.50 | 1343.2 | 444.4 | 0.16 | 1.68% |
| | 44 | 24.36 | 808.9 | 1381.7 | 24.58 | 837.8 | 1030.9 | 0.22 | 3.57% |
| | 48 | 21.83 | 431.5 | 3481.6 | 21.94 | 444.6 | 2311.7 | 0.12 | 3.03% |
| V4 | 36 | 34.77 | 2511.7 | 217.6 | 34.93 | 2546.7 | 160.5 | 0.16 | 1.39% |
| | 40 | 32.02 | 1697.7 | 548.3 | 32.26 | 1728.0 | 360.3 | 0.23 | 1.79% |
| | 44 | 29.24 | 1161.0 | 1381.7 | 29.62 | 1198.3 | 790.6 | 0.38 | 3.21% |
| | 48 | 26.71 | 720.0 | 3481.6 | 27.19 | 760.3 | 1657.2 | 0.48 | 5.60% |

METHOD FOR VIDEO CODING A SEQUENCE OF DIGITIZED IMAGES

The invention relates to a method for video coding a sequence of digitized images as well as to a corresponding apparatus for video coding and a computer program product.

In general, the invention refers to video coding wherein the contents of each image of a video sequence to be encoded are predicted by using a rate distortion optimization. Rate distortion optimization is a well-known technique in video coding which minimizes the distortion D of a video image for a given rate $R_c$ by a set of coding parameters. Particularly, this optimization is described by the following equation:

$$\min\{D\}$$

$$\text{subject to } R \leq R_c \quad (1)$$

To solve the optimization task according to equation (1), this equation is converted by the so-called Lagrange multiplier method into the following equation:

$$\min\{J\}$$

$$\text{where } J = D + \lambda \cdot R \quad (2)$$

In this equation, J is the Lagrangian cost function and $\lambda$ is the Lagrange multiplier. A key problem in rate distortion optimization is how to determine the parameter $\lambda$.

In the reference T. Wiegand and B. Girod, "Lagrange multiplier selection in hybrid video coder control", in IEEE Int. Conf. on Image Processing, 2001, pp. 542-545, vol. 3, a method for selecting a Lagrange multiplier in a video coder control is proposed. Assuming that the distortion D is differentiable everywhere, the minimum of the La-grangian cost J is given by setting its derivative to zero, i.e.:

$$\frac{dJ}{dR} = \frac{dD}{dR} + \lambda = 0 \quad (3)$$

This equation (3) leads to the following equation;

$$\lambda = -\frac{dD}{dR} \quad (4)$$

Equation (4) can be solved for given models of R and D.

In the reference H. Gish and J. Pierce, "Asymptotically efficient quantizing", IEEE Trans. Inf. Theory, vol. 14, no. 5, pp. 676-683, 1968., a high-rate approximation curve is proposed for the dependence of rate R on the distortion D. This approximation reads as follows:

$$R(D) = a \log_2\left(\frac{b}{D}\right) \quad (5)$$

In this equation, a and b are constants. Preserving the high rate assumption, the following equation for the distortion D is derived as:

$$D = \frac{(2Q)^2}{12} = \frac{Q^2}{3} \quad (6)$$

In this equation, Q corresponds to the so-called quantizer value which is a value used in the well-known quantization step in video coding. According to the quantization step, residual coefficients produced in a transformation step are mapped to discrete quantizer reproduction levels, and Q represents half of the distance of those levels.

By inserting equations (5) and (6) into equation (4), the parameter $\lambda$ can be determined by:

$$\lambda = \frac{dD}{dR} = c \cdot Q^2 \quad (7)$$

where c is a constant which is experimentally suggested to be 0.85. The method for determining $\lambda$ according to equation (7) is herein referenced as "HR-$\lambda$ selection", as it is an approximation applicable for high rates (HR). This method is included in the reference software for the state of the art video coding standard H.264/AVC.

The HR-$\lambda$ method has the disadvantage that a high rate is assumed for determining $\lambda$. However, this assumption is not realistic all the time. Furthermore, the parameter $\lambda$ is only related to the quantizer value Q and no property of the input video signal is considered. Thus, $\lambda$ cannot be adapted dynamically to different contents of different videos.

In the reference L. Chen and I. Garbacea, "Adaptive lambda estimation in lagrangian rate-distortion optimization for video coding", in Visual Comm. And Image Processing, Jan. 17-19, 2006, a Lagrange multiplier selection being dependent on the variance of transformed residual coefficients is proposed. The Lagrange multiplier $\lambda$ according to this method is chosen as follows:

$$\lambda = \beta \cdot (\ln(\sigma^2/D) + \delta) \cdot D/R \quad (8)$$

In this equation, $\beta$ and $\delta$ are both coding constants and $\sigma$ refers to the variance of transformed residual coefficients. Due to the dependence of $\lambda$ on this variance, equation (8) is dependent on the contents in the digitized video image and, thus, the above selection of $\lambda$ is able to fit videos dynamically. However, the above selection of $\lambda$ decouples quantization information Q from $\lambda$, and $\lambda$ is calculated by R and D directly, which may result in error propagation, especially in the case of imprecise estimations of R and D.

SUMMARY

It is an object of the invention to provide a method for video coding incorporating rate distortion optimization providing better coding efficiency and enabling a dynamic adaptation of the rate distortion optimization criterion.

This object is solved by the various embodiments of the invention described in more detail below.

The method according to various embodiments of the invention comprises a predicting step a) in which the contents of each image of the digitized video sequence is predicted taking into account a rate distortion optimization criterion being dependent on a Lagrange multiplier. In a transforming step b), the predicting error resulting from the predicting step a) is transformed into a plurality of transformed residual coefficients in each image. Well-known transformation techniques, e.g., the Discrete Cosine Transformation (DCT) or a separable integer transformation (used in H.264) can be applied in step b). In a quantization step c), the transformed residual coefficients in each image of the video sequence are quantized. Well-known quantization techniques may be used in step c), e.g., a linear quantization wherein the intervals of residual coefficient values mapped to one quantizer reproduction level are constant or a logarithmic quantization technique, wherein the intervals of the residual coefficient values mapped to one quantizer reproduction level become bigger with growing values of the coefficients.

A new selection of the Lagrange multiplier is provided. Particularly, the Lagrange multiplier is determined adaptively for each image based on a probability distribution of the transformed residual coefficients of the respective image, the probability distribution having its maximum probability at its mean zero and being formed such that the probabilities decrease to zero from the mean to large absolute values of the transformed residual coefficient, whereby the variance of the probability distribution is calculated from the plurality of transformed residual coefficients in the respective image.

Due to the dependence of the Lagrange multiplier on the variance of the transformed residual coefficients, the Lagrange multiplier is adapted dynamically in dependence on the contents of each image. Furthermore, the probability distribution having the above defined form has shown to be very efficient with respect to achieving a low distortion while keeping the rate of transmission low. Furthermore, the above defined probability distribution in not based on an assumption with respect to the rate and, thus, it can also be applied for low rates of the encoded video stream.

In a preferred embodiment of invention, the probability distribution comprises a generalized Gaussian distribution which is a well-known mathematical distribution. Particularly, the probability distribution may comprise a Gaussian distribution. Furthermore, in a preferred embodiment of the invention, the probability distribution comprises a Laplace distribution.

In an embodiment of the invention, where the probability distribution is assumed to be a Laplace distribution, the Lagrange multiplier $\lambda$ is calculated by solving the following equation:

$$\lambda = -\frac{\partial D/\partial Q}{\partial R/\partial Q}$$

wherein D is an estimation for the distortion and defined as $$D = \frac{e^{\lambda_L F}(2\lambda_L Q + \lambda_L^2 Q^2 - 2\lambda_L^2 QF) + 2 - 2e^{\lambda_L Q}}{\lambda_L^2 (1 - e^{\lambda_L Q})}$$

wherein R is an approximation for the rate and defined as $$R = \frac{S}{\ln 2}\left[\begin{array}{c} -(1 - e^{-\lambda_L(Q-F)})\ln(1 - e^{-\lambda_L(Q-F)}) + \\ e^{-\lambda_L(Q-F)}\left(\ln 2 - \ln(1 - e^{-\lambda_L Q}) - \lambda_L F + \frac{\lambda_L Q}{1 - e^{-\lambda_L Q}}\right) \end{array}\right]$$

where $\lambda_L = \frac{\sqrt{2}}{\sigma}$, wherein:
 $\sigma$ is the variance calculated from the plurality of transformed residual coefficients in the respective image;
 Q is a quantization interval representing half of the distance between quantizer reproduction levels and F is the quantization offset used in the quantizing step c); and
 S is a constant factor, preferably assuming a value greater than 0 and smaller than 1, most preferably assuming 0.181.

In the detailed description below, the evaluation of the above mentioned equations based on the assumption of a Laplacian distribution for the transformed residual coefficients is described.

Instead of using a probability distribution based on one fixed generalized Gaussian distribution, the invention may also be implemented by using a probability distribution based on a mixture of different generalized Gaussian distribution.

In another embodiment of the invention, a lookup table may be used for determining the Lagrange multiplier for each image, the lookup table giving, for each variance, the corresponding value of the Lagrange multiplier. The use of such a lookup table results in a fast performance of the coding method.

In a preferred embodiment of the invention, the quantized and transformed residual coefficients are entropy encoded after the quantization step c). Entropy encoding is a well-known lossless coding technique which is commonly used in video coding to further enhance the compression of the video.

In predicting step a), different prediction techniques may be used. In one embodiment, a temporal prediction comprising motion estimation and motion compensation is applied, wherein the contents of one image are predicted from the contents of one or more temporally prior or later images. Furthermore, a spatial intra-coding prediction may be used in predicting step a), wherein the blocks in an image are predicted from other blocks in this image.

Besides the above defined method, various embodiments of the invention also relate to an apparatus for video coding a sequence of digitized images, comprising: a first mechanism for predicting the contents of each image taking into account a rate distortion optimization criterion being dependent on a Lagrange multiplier; a second mechanism for transforming the prediction error resulting from predicting step a) into a plurality of transformed residual coefficients in each image; and a third mechanism for quantizing the transformed residual coefficients in each image; wherein the apparatus is designed such that the Lagrange multiplier is determined adaptively for each image based on a probability distribution of the transformed residual coefficients of the respective image, the probability distribution having its maximum probability at its mean zero and being formed such that the probabilities decrease to zero from the mean to large absolute values of the transformed residual coefficients, whereby the variance of the probability distribution is calculated from the plurality of transformed coefficients in the respective image.

According to the foregoing, such an apparatus includes a corresponding mechanism for performing any of the above defined embodiments of the method according to the invention. Particularly, additionally to the first, second and third mechanisms, the apparatus may include a fourth mechanism for entropy coding the residual coefficients transformed by the second mechanism quantized by the third mechanism.

According to an embodiment, an apparatus is provided having the following structure: an system input for inputting an input image; a motion estimator comprising a first input connected to the system input at which the input image is provided, a second input, a third input, a first output, and a second output; a first adder comprising a first input connected to the system input, a second input, and an output; a transformer and quantizer comprising an input connected to the output of the first adder, and an output; an entropy coding unit comprising a first input connected to the output of the transformer and quantizer, and a second input connected to the second output of the motion estimator, and an output; a second adder having a first input, a second input, and an output; a motion compensator comprising a first input and a second input, and a first output that is connected to the second input of the motion estimator, and a second output that is connected to the second input of the first adder as well as a first input of the second adder; a spatial intra-predictor comprising an output connected to the second input of the first adder; a deblocker comprising an input connected to the output of the second adder, and an output connected to the third input of the motion estimator; and an inverse quantizer and inverse transformer comprising an input connected to the output of the transformer and quantizer, and an output connected to the second input of the second adder.

Furthermore, the invention comprises a computer program product comprising a computer readable storage medium having encoded thereon computer-executable instructions for executing by a processor for performing a method according the invention.

DESCRIPTION OF THE DRAWINGS

Preferred embodiments of the invention will be described in the following with reference to the accompanying drawings.

DETAILED DESCRIPTION OF THE PREFERRED EMBODIMENTS

Figures 1, 2:
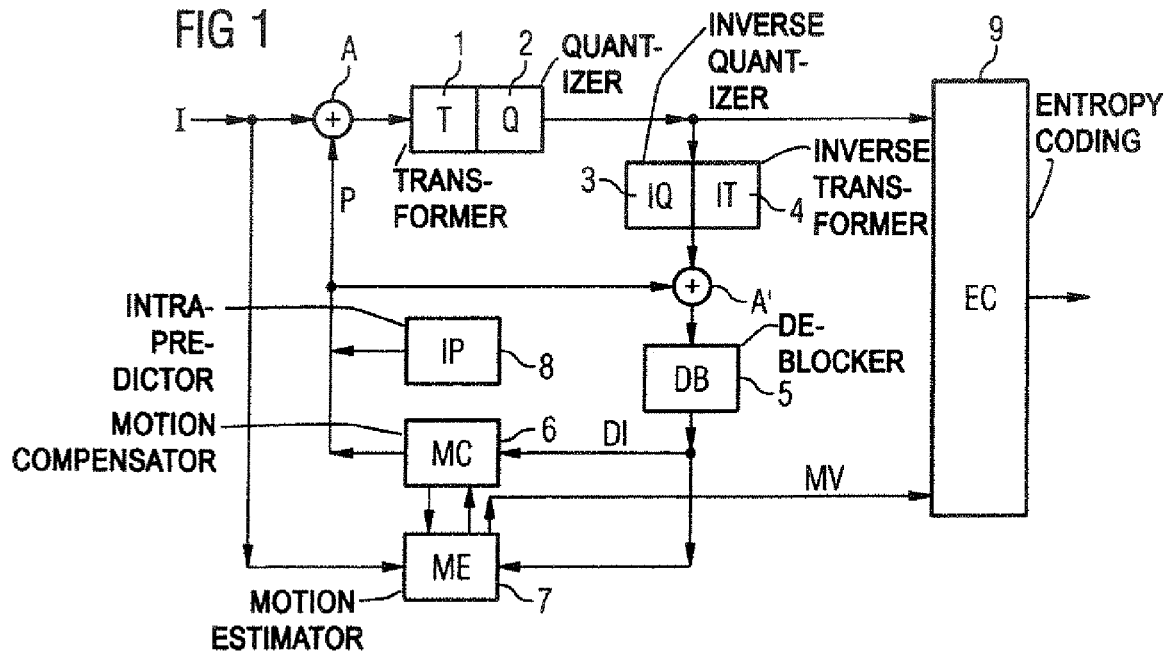
FIG. 1 is a block schematic diagram of an encoding architecture in according to an embodiment of the invention.
FIG. 2 is a table comparing the results of a method according to one embodiment of the invention with results achieved by prior art methods for different video sequences.
Figure 3A:
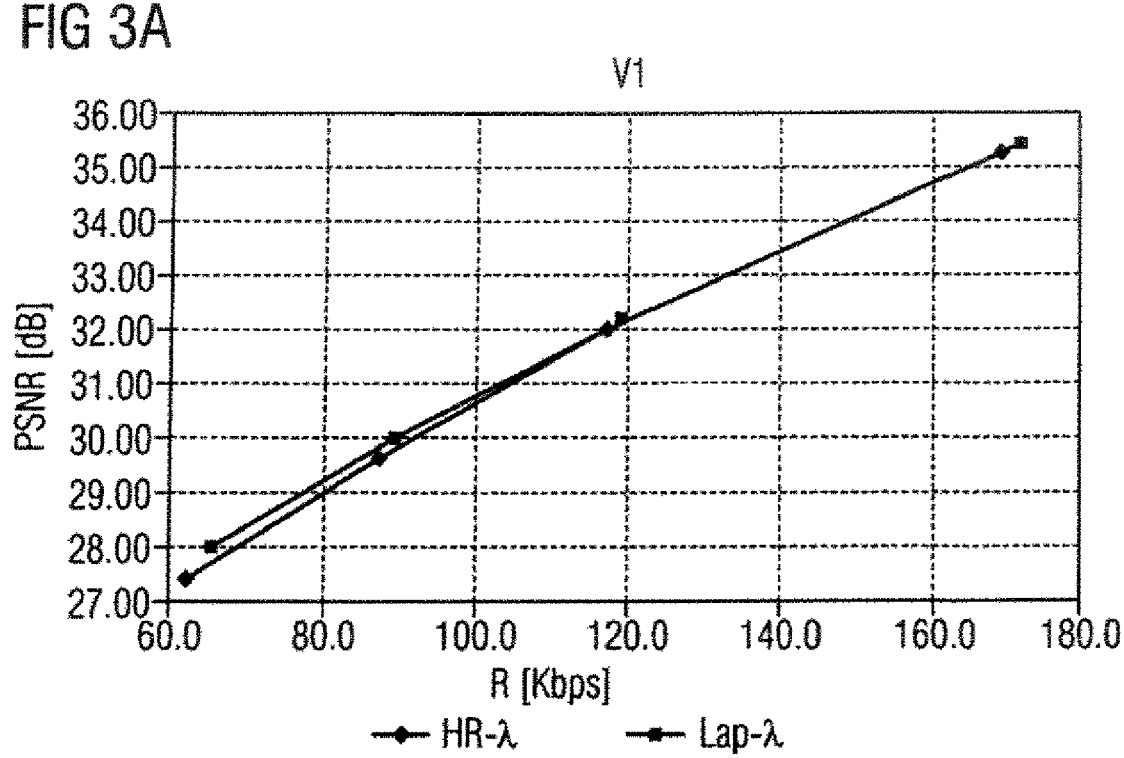
FIGS. 3A, B are graphs of the results shown in the table of FIG. 2.
Figure 3A:
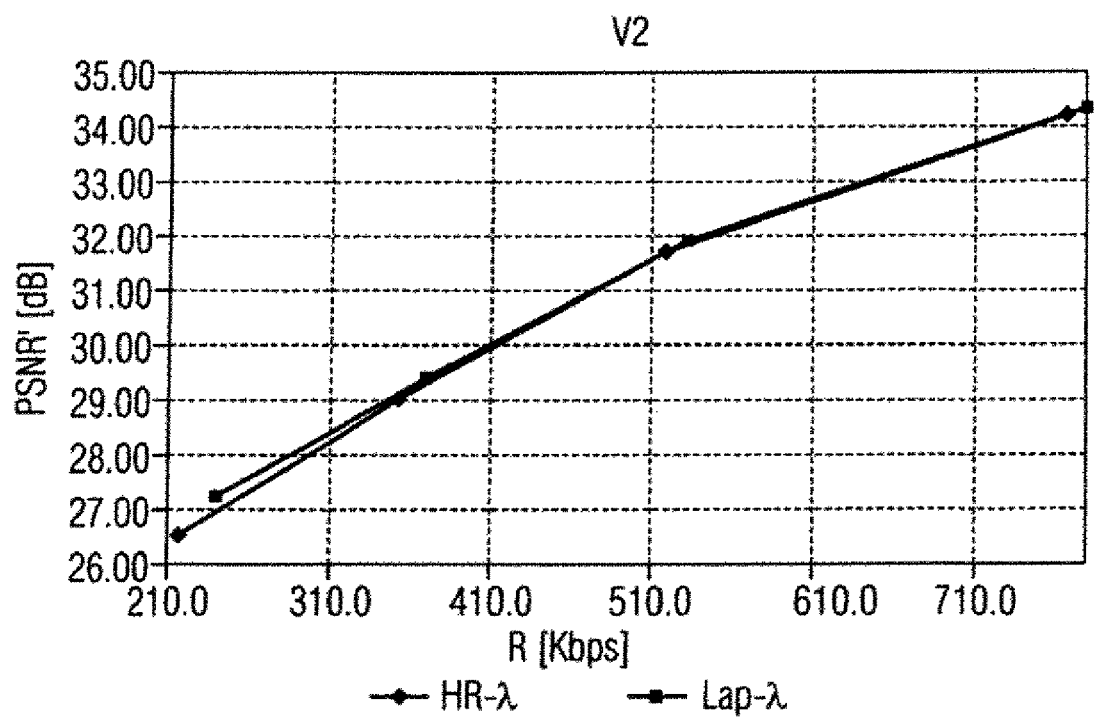
Figure 3B:
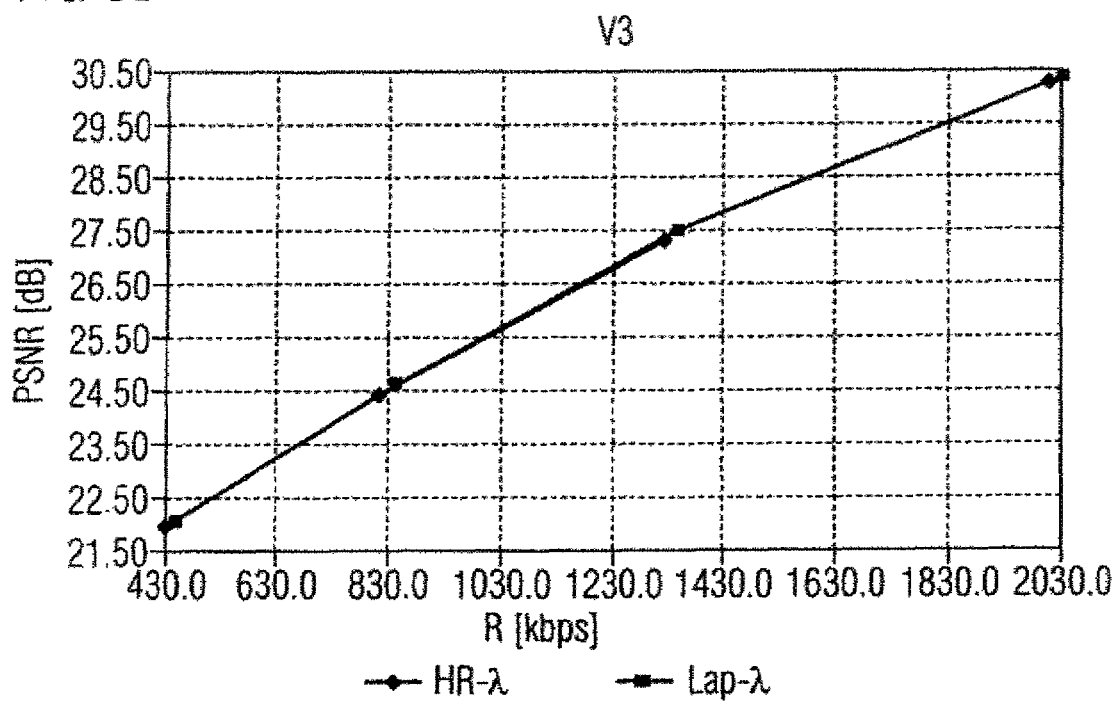
Figure 3B:
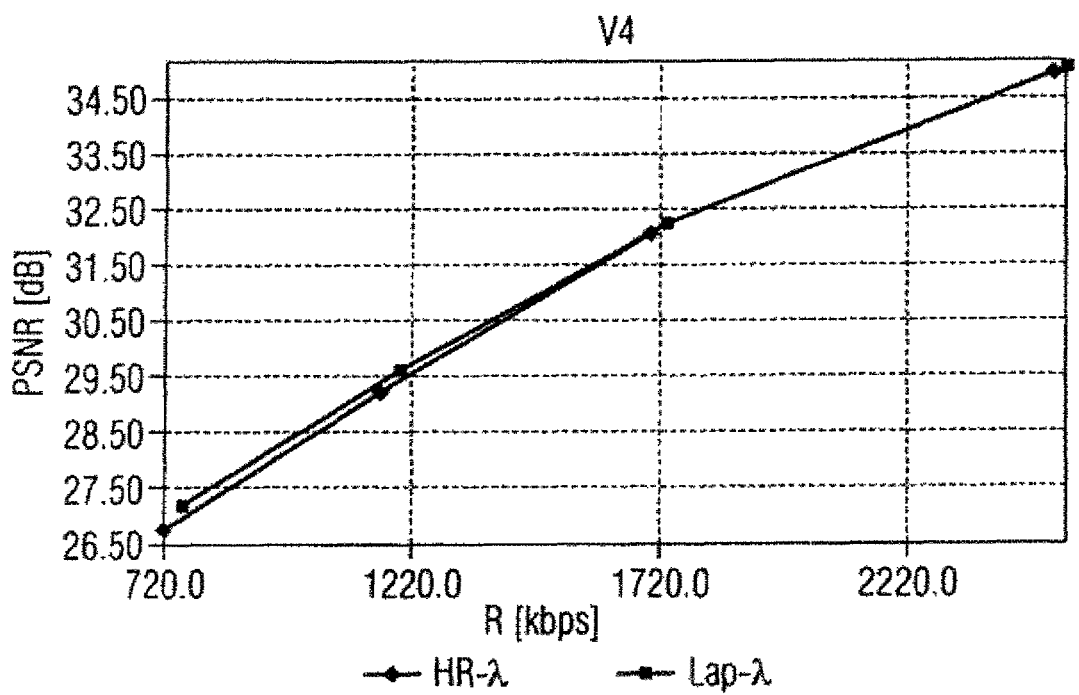

FIG. 1 shows an example of a video encoder based on the video coding standard H.264/AVC. In the encoder of FIG. 1, a sequence of digitized images T is compressed by encoding the so-called prediction error resulting from the prediction performed in a predicting step.

The prediction error is generated by supplying the input image T to an adder A subtracting from the input image I a predicted image P determined in a corresponding prediction step. The prediction error is supplied to the transformer 1 performing a well-known transformation T on the digitized image resulting in transformed residual coefficients.

After a scaling step (not shown), the transformed residual coefficients of each image I are subjected to a quantization Q performed in a corresponding quantizer 2. The resulting transformed and quantized residual coefficients are supplied to an entropy encoder 9 performing entropy coding EC. Furthermore, those coefficients are scaled and supplied to an inverse quantizer 3 performing an inverse quantization IQ on the coefficients.

After this inverse quantization, the coefficients are subjected to an inverse transformation IT by inverse transformer 4. The resulting decoded error is added to the predicted image P in an adder A'. The image resulting from this is subjected to a deblocking step DB in a corresponding deblocker 5.

As a result, a decoded image DI is obtained, which is supplied to a motion compensator 6 performing a motion compensation. The motion compensation is performed by the use of so-called motion vectors MV which are calculated in a motion estimation step ME in a motion estimator 7. The motion vectors describe the motion of picture blocks from one image to another. After performing the motion compensation MC, the predicted image P is obtained, which is supplied to the adder A in order to determine the prediction error.

The prediction based on motion compensation MC and motion estimation ME is a temporal prediction. When rate distortion optimization is used for this temporal prediction, different prediction methods for a respective image are applied. The prediction methods, e.g., differ in the feature which images and how many images are used for determining the predicted image P. For each encoded image obtained by the different predicting methods, the cost function J according to equation (2) on the basis of the Lagrange multiplier is calculated, the Lagrange multiplier being determined by the method associated with the invention. The prediction method resulting in the lowest cost J for the respective image is used as the prediction method for this image.

Instead of the temporal prediction described before, the encoder in FIG. 1 may use a spatial intra-prediction IP being performed by intra predictor 8. In this intra-prediction, the so-called macroblocks in each image are predicted from neighboring previously encoded macroblocks. To exploit spatial correlation among pixels in the image to be encoded, the coding standard H.264 uses three basic types of prediction, namely full-macroblock prediction for 16×16 luma or the corresponding chroma block size, 8×8 luma prediction (called FRExt-only) or 4×4 luma prediction.

For the full-macroblock prediction, the pixel values of an entire macro block of luma or chroma data are predicted from the edge pixels of neighboring previously decoded macroblocks. Full-macroblock predictions can be performed in one of four different ways that can be selected by the encoder for the prediction of each particular macroblock. Those different ways refer to vertical, horizontal, DC and planar prediction. For the vertical and horizontal prediction types, the pixel values of a macroblock are predicted from the pixels just above or to the left of the macroblock, respectively. In DC prediction, the luma values of the neighboring pixels are averaged and the resulting average value is used as a predictor. In planar prediction, a three-parameter curve fitting equation is used to form a prediction block having a brightness slope in the horizontal direction and a brightness slope in the vertical direction that approximately matches the neighboring pixels.

In the above-mentioned 4×4 luma prediction, the values of each 4×4 block of luma samples are predicted from the neighboring pixels above or left of a 4×4 block, and 9 different directional ways of performing the prediction can be selected by the encoder. The above mentioned 8×8 luma prediction basically uses the same concepts as the 4×4 prediction, but with a prediction block size that is 8×8 rather than 4×4 and with low-pass filtering of the predictor to improve prediction performance.

When rate distortion optimization is applied to intra-prediction, different intra-prediction modes are applied to the blocks in each image, and the prediction mode leading to the lowest cost according to equation (2) is used for the respective blocks in the image, wherein the Lagrange multiplier $\lambda$ is selected based on a method associated with the invention.

In the following, an embodiment of the invention is described, where the Lagrange multiplier for rate distortion optimization is determined based on a Laplace distribution. Furthermore, results based on this embodiment will be presented when applying the inventive method in the reference software of H.264/AVC for intra prediction.

The Laplacian distribution applied for the intra predicted images has a zero mean and is defined as follows:

$$f_L(x) = \frac{1}{2}\lambda_L e^{-\lambda_L |x|} \tag{9}$$

$$\lambda_L = \frac{\sqrt{2}}{\sigma} \tag{10}$$

In equation (9), x represents the transformed residual coefficients after applying the transformation step T in FIG. 1 and $\sigma$ is the variance of the transformed residual coefficients in an image I which indicates the property of the input video. Because of the one-to-one mapping between $\sigma$ and $\lambda_L$, the latter will be used instead in the following expressions for simplicity. In the H.264/AVC standard, a uniform reconstruction quantizer is used. Therefore, the entropy of the transformed residual coefficients after quantization step Q in FIG. 1 can be modeled as follows:

$$H = -P_0 \cdot \log_2 P_0 - 2 \sum_{n=1}^{\infty} P_n \cdot \log_2 P_n \qquad (11)$$

$$P_0 = 2 \int_0^{Q-F} f_L(x) \, dx \qquad (12)$$

$$P_n = 2 \int_{nQ-F}^{(n+1)Q-F} f_L(x) \, dx \qquad (13)$$

Q indicates the quantization interval and F is the rounding offset used for quantization. In the H.264/AVC standard, Q is determined by the well-known quantization parameter qp and reads as follows:

$$Q = 2^{\frac{(qp-12)}{6}} \qquad (14)$$

Since the Laplacian distribution assumed for the residual coefficients is usually not an ideal Laplacian distribution, the rate R is compensated by a factor S and reads as follows:

$$R = S \cdot H \qquad (15)$$

Similarly, the distortion D can be written as follows:

$$D = 2 \int_0^{Q-F} x^2.$$

Putting equation (9) into equations (15) and (16), results in a rate R and a distortion D defined as follows:

$$R = \frac{S}{\ln 2} \left[ \begin{array}{l} -(1 - e^{-\lambda_L(Q-F)}) \ln(1 - e^{-\lambda_L(Q-F)}) + \\ e^{-\lambda_L(Q-F)} \left( \ln 2 - \ln(1 - e^{-\lambda_L Q}) - \lambda_L F + \frac{\lambda_L Q}{1 - e^{-\lambda_L Q}} \right) \end{array} \right] \qquad (17)$$

$$D = \frac{e^{\lambda_L F}(2\lambda_L Q + \lambda_L^2 Q^2 - 2\lambda_L^2 QF) + 2 - 2e^{\lambda_L Q}}{\lambda_L^2 (1 - e^{\lambda_L Q})} \qquad (18)$$

As $\lambda_L$ is an inherent property of the input videos, in can be supposed to be constant during a short time, such as several images. Consequently, equation (4) turns to:

$$\lambda = \frac{\partial D / \partial Q}{\partial R / \partial Q} \qquad (19)$$

By putting equations (17) and (18) into equation (19), the Laplacian distribution based on the Lagrange multiplier $\lambda$ can be determined The complete expression according to equation (19) is too long and will not be presented here. Practically, it can be easily computed by mathematical software or well-known numerical methods. In one embodiment, a lookup table is used to determining $\lambda$ in order to save computation time.

The above described method for calculating the Lagrange multiplier based on equations (17) to (19) (referred to as "Lap-$\lambda$" in the following) was embedded into an H.264/AVC environment for intra frame encoding. The rounding offset F in equations (17) and (18) is set to be Q/3. The factor S in equation (17) was determined by using the fact that the Laplacian distribution will reduce to a uniform distribution when $\lambda_L \to 0$ ($\sigma \to \infty$). Consequently, in the limit of $\lambda_L \to 0$, the following equation holds:

$$\lim_{\lambda_L \to 0} \lambda = \lim_{\lambda_L \to 0} -\frac{\partial D / \partial Q}{\partial R / \partial Q} = \frac{2 \ln 2}{9S} \cdot Q^2 \qquad (20)$$

Equation (20) is set equal to equation (7), providing.

$$S = \frac{2 \ln 2}{9c} = 0.181 \qquad (21)$$

Hence, by choosing S=0.181, this guarantees that the inventive Lap-$\lambda$ selection equals the HR-$\lambda$ selection in the limit when $\lambda_L$ goes to 0.

In the implementation used for testing the invention, $\lambda_L$ is calculated according to the variance o of the transformed residual coefficients for each image on the basis of equations (17) to (21). For the first image, no variance information is available. Therefore, for the first image, the HR-$\lambda$ selection is used instead of the Lap-$\lambda$ selection according to various embodiments of the invention.

The implementation used for testing the invention was applied to four video sequences V1, V2, V3 and V4. Video V1 refers to a small movement video showing a person making a phone call. Video V2 also refers to a small movement video of playing children. Video V3 refers to a large movement of a person playing tennis. Video V4 is a computer animation. The first 50 images of each sequence were coded, all in intra-frame with the well-known Context-Adaptive Arithmetic Coding (CABAC) technique. Rate distortion optimization was used based on the state of the art HR-$\lambda$ selection as well as based on the Lap-$\lambda$ selection according to embodiments of the invention. In order to ease the evaluation of the relationship among the Lagrange multiplier $\lambda$, the parameter qp and the parameter $\lambda_L$, all the sequences shared the same fixed qp.

The table according to FIG. 2 shows the simulation results for the different videos V1 to V4 and for different parameters gp. Peak signal-to-noise rate (PSNR) values in dB, the rate R in Kbps (kilo bits per second) and the average parameter Aver $\lambda$ were calculated for the HR-$\lambda$ selection and the Lap-$\lambda$ selection. The PSNR value is a measure of the distortion and the lower this value, the higher the distortion D. Furthermore, the table of FIG. 2 shows the difference $\Delta$PSNR between the PSNR values of both methods as well as the difference $\Delta$R of the rate of both methods.

FIG. 3 shows a graphical representation of the results shown in the table in FIG. 2. Particularly, FIG. 3 shows, for each Video V1 to V4, a diagram representing the dependency of the PSNR value on the rate R. It is evident from FIG. 2 and FIG. 3, that the Lap-$\lambda$ selection is all the time more efficient than the HR-$\lambda$ selection, especially for the animation according to video V4 and for the small movement videos V1 and V2.

According to FIG. 3, a gain of up to 0.3 dB and 0.2 dB in the PSNR values were achieved for videos V1 and V4, respectively, while a little gain was achieved for video V3. For video V3, it can be observed from the table of FIG. 2 that the differences of the average λ between the two selection methods are much smaller than those in the other videos. Such a behavior can be explained by the property of the new λ (Lap-λ) function. The new λ increases much faster with smaller $\lambda_L$ which corresponds to larger variances σ.

In the extreme condition when $\lambda_L$ approaches 0, the new λ approaches the value of the HR-λ selection. That is, the smaller $\lambda_L$, the smaller differences between the two methods. Thus, less gain is achieved for fast videos having a large variance σ and thus a small $\lambda_L$. On the other hand, for computer animations and small movement videos, where the average λ calculated by the inventive method is much smaller than those of the HR-λ selection, the method according to the invention performs much better.

According to the above simulation results, an embodiment of the invention based on an adjustment of the Lagrange multiplier adaptively based on a Laplacian distribution outperforms the state of the art technique in the reference software of H.264/AVC. The simulations were performed for intra-frame predictions but may be applied to inter-frame prediction as well.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word "mechanism", as used herein, is not limited to any specific hardware configuration, but could incorporate any combination of hardware or software elements. Numerous modifications and adaptations will be readily apparent to those skilled in this art without departing from the spirit and scope of the present invention.

What is claimed is:

1. A method for video coding a sequence of digitized images using a video encoder apparatus having one or more processors operable to execute computer-executable instructions, said method comprising:
   (a) predicting, with the one or more processors, contents of each image utilizing a rate distortion optimization criterion that is dependent on a Lagrange multiplier, thereby determining a prediction error;
   (b) transforming, with the one or more processors, the prediction error resulting from predicting step (a) into a plurality of transformed residual coefficients in each image;
   (c) quantizing, with the one or more processors, the transformed residual coefficients in each image;
   (d) determining, with the one or more processors, the Lagrange multiplier for each image based on a probability distribution of the transformed residual coefficients of the respective image, the probability distribution having its maximum probability at its mean zero and being formed such that the probabilities decrease to zero from the mean to large absolute values of the transformed residual coefficients, wherein a variance of the probability distribution is calculated from the plurality of transformed residual coefficients in the respective image; and
   (e) video coding, with the one or more processors, a sequence of digitized images based on the determined Lagrange multiplier for each image.

2. The method according to claim 1, wherein the probability distribution comprises a generalized Gaussian distribution.

3. The method according to claim 2, wherein the probability distribution comprises a Gaussian distribution.

4. The method according to claim 2, wherein the probability distribution comprises a Laplace distribution.

5. The method according to claim 4, wherein the Laplace multiplier λ is calculated by solving the following equation:

$$\lambda = \frac{\partial D/\partial Q}{\partial R/\partial Q}$$

wherein D is an estimation for the distortion and defined as $$D = \frac{e^{\lambda_L F}(2\lambda_L Q + \lambda_L^2 Q^2 - 2\lambda_L^2 QF) + 2 - 2e^{\lambda_L Q}}{\lambda_L^2(1 - e^{\lambda_L Q})}$$

wherein R is an approximation for the rate and defined as $$R = \frac{S}{\ln 2}\left[\begin{array}{c} -(1 - e^{-\lambda_L(Q-F)})\ln(1 - e^{-\lambda_L(Q-F)}) + \\ e^{-\lambda_L(Q-F)}\left(\ln 2 - \ln(1 - e^{-\lambda_L Q}) - \lambda_L F + \frac{\lambda_L Q}{1 - e^{-\lambda_L Q}}\right) \end{array}\right]$$

wherein:
   σ is a variance calculated from the plurality of transformed residual coefficients in the respective image;

Q is a quantization interval representing half of a distance between quantizer reproduction levels and F is the quantization offset used in the quantizing step (c); and S is a constant factor.

6. The method according to claim 5, wherein 0>S>1.
7. The method according to claim 6, wherein S=0.181.
8. The method according to claim 2, wherein the probability distribution is a mixture of different generalized Gaussian distributions.
9. The method according to claim 1, wherein a lookup table is utilized for determining the Lagrange multiplier for each image.
10. The method according to claim 1, the method further comprising, after the quantization step (c):
  entropy encoding, with the one or more processors, the quantized and transformed residual coefficients.
11. The method according to claim 1, wherein a spatial intra coding prediction is used in predicting step (a).
12. The method according to claim 1, wherein a temporal prediction comprising motion estimation and motion compensation is used in predicting step (a).
13. An apparatus for video coding a sequence of digitized images, the apparatus comprising:
  one or more processors;
  an adder module configured to predict contents of each image taking into account a rate distortion optimization criterion being dependent on a Lagrange multiplier and producing a prediction error;
  a transformer module configured to transform the prediction error into a plurality of transformed residual coefficients in each image;
  a quantizer module configured to quantize the transformed residual coefficients in each image;
  the apparatus configured such that the Lagrange multiplier is determined for each image based on a probability distribution of the transformed residual coefficients of the respective image, the probability distribution having its maximum probability at its mean zero and being formed such that the probabilities decrease to zero from the mean to large absolute values of the transformed residual coefficients, whereby the variance of the probability distribution is calculated from the plurality of transformed residual coefficients in the respective image and a sequence of digitized images is video coded based on the determined Lagrange multiplier for each image.
14. The apparatus according to claim 13, further comprising an entropy encoder module configured to entropy code the residual coefficients transformed by the transformer module and quantized by the quantizer module.
15. A computer program product comprising a non-transitory computer readable storage medium having encoded thereon computer-executable instructions for executing by the one or more processors for performing a method of video coding a sequence of digitized images, said method comprising:
  (a) predicting, with the one or more processors, contents of each image utilizing a rate distortion optimization criterion that is dependent on a Lagrange multiplier, thereby determining a prediction error;
  (b) transforming, with the one or more processors, the prediction error resulting from predicting step (a) into a plurality of transformed residual coefficients in each image;
  (c) quantizing, with the one or more processors, the transformed residual coefficients in each image;
  (d) determining, with the one or more processors, the Lagrange multiplier for each image based on a probability distribution of the transformed residual coefficients of the respective image, the probability distribution having its maximum probability at its mean zero and being formed such that the probabilities decrease to zero from the mean to large absolute values of the transformed residual coefficients, wherein a variance of the probability distribution is calculated from the plurality of transformed residual coefficients in the respective image; and
  (e) video coding, with the one or more processors, a sequence of digitized images based on the determined Lagrange multiplier for each image.
16. An apparatus for video coding a sequence of digitized images, the apparatus comprising:
  one or more processors;
  a system input module for inputting an input image;
  a first adder module comprising a first input connected to the system input module to receive the input image and an output, the first adder module configured to generate a prediction error by subtracting from the input image a predicted image;
  a transformer and quantizer module comprising an input connected to the output of the first adder module and an output, the transformer and quantizer module configured to perform a transformation on the input image received from the first adder module to generate transformed residual coefficients, and after a scaling step subject the transformed residual coefficients to a quantization to generate transformed and quantized residual coefficients;
  an entropy coding module connected to the output of the transformer and quantizer module, the entropy coding module configured to determine, with the one or more processors, a Lagrange multiplier for each image based on a probability distribution of the transformed residual coefficients of a respective image, wherein a variance of the probability distribution is calculated from the transformed residual coefficients in the respective image;
  an inverse quantizer and inverse transformer module comprising an input connected to the output of the transformer and quantizer module and an output, the inverse quantizer and inverse transformer module configured to receive the transformed and quantized residual coefficients from the transformer and quantizer module and perform an inverse quantization on the transformed and quantized residual coefficients and, after an inverse quantization, subject the residual coefficients to an inverse transformation to generate a decoded error;
  a second adder module having a first input connected to the output of the inverse quantizer and inverse transformer module and an output, the second adder module configured to add the decoded error to the predicted image to produce a second image;
  a deblocker module comprising an input connected to the output of the second adder module and an output, the deblocker module configured to deblock the second image to generate a decoded image; and
  a motion compensator module comprising an input connected to the output of the deblocker module and an output that is connected to a second input of the first adder module as well as a second input of the second adder module, the motion compensator module configured to perform a motion compensation on the decoded image to obtain the predicted image which is supplied to the first adder module to determine the prediction error to facilitate video coding the sequence of digitized images.

* * * * *